United States Patent [19]

Sassano

[11] Patent Number: 4,752,533
[45] Date of Patent: Jun. 21, 1988

[54] NON-AQUEOUS SOLVENTLESS POLYESTER VARNISH

[75] Inventor: Daniel R. Sassano, Monroeville, Pa.

[73] Assignee: Westinghouse Electric Corp., Pittsburgh, Pa.

[21] Appl. No.: 2,057

[22] Filed: Jan. 9, 1987

[51] Int. Cl.$^4$ .............................................. C08L 67/06
[52] U.S. Cl. .................................. 428/480; 427/385.5; 427/388.2; 525/27; 525/41; 525/445; 528/298
[58] Field of Search .................. 528/298; 525/27, 445, 525/49, 41; 428/480; 427/385.5, 388.2

[56] References Cited

U.S. PATENT DOCUMENTS

| | | | |
|---|---|---|---|
| 3,347,806 | 10/1967 | Zimmermann | 528/298 |
| 4,029,848 | 6/1977 | Nelson | 428/430 |
| 4,246,367 | 1/1981 | Curtis | 525/49 |
| 4,309,519 | 1/1982 | Obara | 525/445 |
| 4,525,427 | 6/1985 | Bayha | 428/458 |

OTHER PUBLICATIONS

Smith, et al., "Proceedings of the 22nd Annual Technical Conference", SPI, Reinforced Plastics Division, Washington, D.C. 1967.

*Primary Examiner*—Patricia Short
*Attorney, Agent, or Firm*—A. Mich, Jr.

[57] ABSTRACT

Disclosed is a method of making a non-aqueous solventless polyester varnish. A composition is prepared which comprises about one mole of maleic anhydride, about 0.25 to about 0.35 mole of dicyclopentadience, about 0.65 to about 0.75 mole of ethylene glycol, and about 0.35 to about 0.45 mole of a polyol. The composition is heated to about 150° to about 170° C., and then to about 200° to about 210° C., which condenses out water, forms an unsaturated polyester and, reduces the acid number to less than about 45. The composition is cooled to a temperature below about 150° C., and about 0.1 to about 0.5% of an inhibitor is added to said composition, followed by an unsaturated aromatic compound which can be styrene, vinyl toluene, or mixtures thereof, in a ratio of about 20 to about 40 pbw unsaturated aromatic compound to about 60 to about 80 pbw unsaturated polyester. When it is desirable to use the composition, 0.5 to about 1.5 percent by weight of a catalyst is added to the composition. The composition is applied to a rotating apparatus and is cured at about 150° to about 160° C. for about 45 to about 60 minutes.

11 Claims, No Drawings

NON-AQUEOUS SOLVENTLESS POLYESTER VARNISH

BACKGROUND OF THE INVENTION

In the manufacture of electrical rotating apparatus, such as armature coils, a trickle varnish is slowly painted over the completed coils of a stator and is cured on the coil. The principal purpose of the varnish is to prevent the wires that form the coil from moving or flying apart when the coil is rotated or is in a large magnetic field. Since the coils are often operated at elevated temperatures, a suitable varnish for this purpose must have a high bond strength at temperatures of up to about 150° C. In addition, a good trickle varnish should have good electrical properties so that it adds to the insulation of the coil. Because of regulations prohibiting the emission of solvents into the atmosphere, it is also desirable that the varnish be 100% solids and contain no substance that will evaporate into the atmosphere. Of course, to be economically useful, the varnish should also be made of inexpensive materials, should have a low viscosity, and be fast gelling and fast curing, in order to reduce manufacturing costs. Until now it has been very difficult to obtain a varnish which has all of these properties.

SUMMARY OF THE INVENTION

I have discovered that an inexpensive 100% solids polyester varnish having high bond strength at elevated temperatures and other desirable properties can be made using cetain very specific materials in a narrowly defined ratio, provided the composition is prepared in a particular sequence within certain temperature ranges. The most outstanding and unexpected property of the varnish of this invention is its high bond strength at elevated temperatures. Bond strengths of 15 pounds at 150° C. have been obtained. Moreover, these high bond strengths can be obtained after curing for only an hour or less at 150° C. In addition to being fast gelling and fast curing, the varnish of this invention has a low viscosity which makes it easy to apply to electrical apparatus. It also has good electrical and thermal properties and is manufactured from relatively inexpensive materials. Finally, it emits no solvents or gases during cure.

BRIEF DESCRIPTION OF THE PREFERRED EMBODIMENT

The non-aqueous solventless polyester varnish of this invention is prepared from six different components plus a catalyst that is used in curing the composition. The following is a description of each of the components used in making the polyester varnish of this invention.

The first component is maleic anhydride. No other anhydride has the properties necessary to produce suitable polyester varnish. Also, maleic acid cannot be used instead of maleic anhydride because maleic acid lowers the bond strength of the varnish.

Similarly, the second component of the varnish is limited to dicyclopentadiene as no other similar compound results in a varnish with the necessary properties.

The third component is ethylene glycol. No other polyol has been found suitable when substituted for ethylene glycol.

The fourth component is a polyol other than ethylene glycol. Suitable polyols include neopentylglycol, propylene glycol, glycerine, 1,4-butanediol, trimethylol propane, tris(2-hydroxyethyl)cyanurate, tris(2-hydroxyethyl)isocyanurate, trimethylol ethane, erythritol, pentaerythritol, and Dow Resin 565, which has the structure:

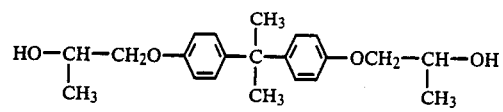

The preferred polyol is 1,2-propylene glycol because it produces a varnish with superior properties. The amount of the polyol appears to be highly critical and should preferably be about 34 to about 37 mole percent of the total moles of ethylene glycol plus polyol.

In preparing the polyester varnish, a composition is made of one mole maleic anhydride, about 0.25 to about 0.35 mole dicyclopentadiene, about 0.65 to about 0.75 mole of ethylene glycol, and about 0.35 to about 0.45 mole of the polyol. The ethylene glycol and polyol must be present in the initial reaction, or the bond strengths will be too low. That composition is heated to about 150 to about 170° C. which refluxes the composition. While I do not wish to be bound by any theories, I believe that dicyclopentadiene forms cyclopentadiene, which reacts with the maleic anhydride according to the following equations:

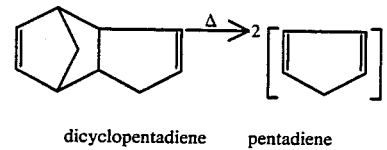

dicyclopentadiene    pentadiene

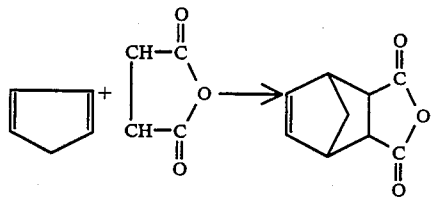

The composition is then continued to be heated, but at a higher temperature of about 200° to about 210° C., which condenses out water. I believe that this occurs because the cyclopentadiene anhydride reacts with the ethylene glycol and the polyol according to the following equation:

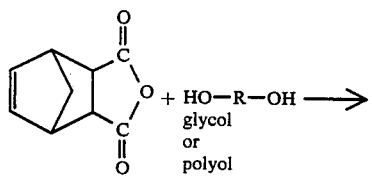

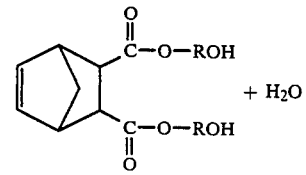

The resulting hydroxy ester also reacts with maleic anhydride to form an unsaturated polyester. The heating should be continued until the acid number is reduced to less than about 45, which indicates that the reaction is complete.

The composition is then cooled to a temperature below about 150° C. and the fifth component, about 0.1 to about 0.5% by weight, based on total composition weight, of an inhibitor, is added. Suitable inhibitors are well known in the art and include compounds such as hydroquinone, methylhydroquinone, para-benzoquinone, catechol, and diphenylquinone. The preferred inhibitor is hydroquinone because it is readily available and has been found to work very well.

The sixth component of the composition is an aromatic unsaturated compound which can be styrene, vinyl toluene, or mixtures thereof. The unsaturated aromatic compound is preferably styrene as it produces a varnish having better bond strength. To prevent the polymerization of the aromatic unsaturated compound, it is preferably added to the composition after the addition of the inhibitor, and after the temperature of the composition is lowered, preferably to at least about 130° C. About 20 to about 40 pbw (parts by weight, based on total composition weight) of the aromatic unsaturated compound are used with about 60 to about 80 pbw of the unsaturated polyester, with a preferred ratio being about 30 pbw aromatic unsaturated compound to about 70 pbw unsaturated polyester. The resulting composition can then be stored until it is ready to be used.

When the composition is to be used, an addition polymerization catalyst is added. Suitable addition polymerization catalysts are well known in the art and include most peroxides, including benzoyl peroxide, benzoyl acetyl peroxide, dinaphthoyl peroxide, benzoyl lauryl peroxide, di-t-butyl peroxide dicumyl peroxide, hydrogen peroxide, bis(t-butyl peroxy)di-isopropyl benzene, and 2,5-dimethyl-2-5-di(t-butyl peroxy)hexane. The preferred peroxide is t-butyl perbenzoate because it is a liquid so that it easily mixes with the composition, and it is fast. The amount of catalyst should be about 0.5 to about 1.5 percent by weight. No water is added to the composition.

Once the composition has been catalyzed, it should be used at once. The composition is applied by painting, dipping, or pouring it onto the apparatus to be coated. The varnish is particularly applicable to rotating apparatus such as armatures, stators, and other types of coils. It is especially useful for coating alternator armatures as they require a varnish having the particular properties of the varnish of this invention. The application of the varnish to the apparatus produces a thin film of varnish on the apparatus, typically about 1 to about 1.5 mils thick. The coated apparatus is then cured at a temperature of, preferably, about 150° to about 160° C. Cure time can be up to about 60 minutes or longer, but is preferably about 45 to about 60 minutes. Generally speaking, within limits, the longer the cure time is the greater will be the bond strength, especially at elevated temperatures.

The following examples further illustrate this invention.

EXAMPLE 1

The following composition was charged to a kettle:

|  | Grams | Moles |
| --- | --- | --- |
| maleic anhydride | 49.0 | 0.50 |
| dicyclopentadiene | 19.8 | 0.15 |
| propylene glycol | 14.9 | 0.20 |
| ethylene glycol | 21.8 | 0.35 |

The composition was refluxed at 150° to 170° C. for one hour with minimum nitrogen sparge. The composition was heated to 200° C. over a one-hour period, then at 200° to 210° C. until an acid number of 45 or less was reached. The composition was cooled to 150° C. and 18.6 grams of hydroquinone were added. After cooling to about 130° C., 45.0 grams of styrene were added.

The varnish had a viscosity at 25° C. of 395 cps, a specific gravity at 25° C. of 1.128, and an unsaturated polyester content of 65 to 75%.

To a sample of the varnish was added 1% t-butyl perbenzoate. After a gel time of about 13.5 minutes, and a cure time of 60 minutes, the vanish hardened to 95/92 Shore D.

The bond strength of the varnish was determined using ASTM test D2519-75 by dipping helical coils of AWG #18 copper wire into the catalyzed varnish and heating at 150° C. The resulting bond strength was a function of cure time at 150° C.:

| Time at | Bond strength (Pounds) | |
| --- | --- | --- |
| 150° C. (Minutes) | Room Temperature | At 150° C. |
| 15 | 20 | 10 |
| 30 | 25 | 11 |
| 45 | 30 | 13 |
| 60 | 30 | 15 |

I claim:
1. A method of making a non-aqueous solventless polyester varnish comprising:
   (A) preparing a composition which consists essentially of:
      (1) maleic anhydride;
      (2) about 0.25 to about 0.35 moles dicyclopentadiene per mole of maleic anhydride;
      (3) about 0.65 to about 0.75 moles ethylene glycol per mole of maleic anhydride;
      (4) about 0.35 to about 0.45 moles of a polyol, other than said ethylene glycol, per mole of maleic anhydride;
   (B) heating said composition to about 150° to about 170° C.;
   (C) heating said composition to about 200° to about 210° C., whereby water is condensed out, until the acid number is reduced to less than about 45 and an unsaturated polyester is formed;
   (D) cooling said composition to a temperature below about 150° C.;
   (E) adding to said composition about 0.1 to about 0.5% of an inhibitor; and
   (F) adding to said composition an unsaturated aromatic compound selected from the group consisting of styrene, vinyl toluene, and mixtures thereof, in a ratio of about 20 to bout 40 pbw unsaturated aromatic compound to about 60 to about 80 pbw unsaturated polyester.

2. A method according to claim 1 including the additional last step of adding about 0.5 to about 1.5% by weight of a catalyst to said composition.

3. A method according to claim 2 wherein said catalyst is t-butyl perbenzoate.

4. A method according to claim 1 wherein said polyol is 1,2-propylene glycol.

5. A method according to claim 1 including the additional step of cooling said composition to a temperature below about 130° C. prior to adding said unsaturated aromatic compound.

6. A method according to claim 1 wherein said polyol is about 34 to about 37 mole percent of the total moles of said ethylene glycol plus said polyol.

7. A non-aqueous solventless polyester varnish made according to the method of claim 1.

8. A catalyzed non-aqueous solventless polyester varnish made according to the method of claim 2.

9. A method using the varnish of claim 8 comprising applying said varnish to rotating apparatus and curing at about 150° to about 160° C. for about 45 to about 60 minutes.

10. A method according to claim 9 wherein said rotating apparatus is an alternator armature.

11. Varnished rotating apparatus made according to the method of claim 9.

* * * * *